United States Patent
Sarneel

(10) Patent No.: US 6,663,909 B2
(45) Date of Patent: Dec. 16, 2003

(54) BAKERY PRODUCTS CONTAINING STARCH N-ALKENYL SUCCINATE

(75) Inventor: Johan Frans Sarneel, Zuiddorpe (NL)

(73) Assignee: Cerestar Holding B.V., La Sas van Gent (NL)

(*) Notice: Subject to any disclaimer, the term of this patent is extended or adjusted under 35 U.S.C. 154(b) by 0 days.

(21) Appl. No.: 09/866,482

(22) Filed: May 29, 2001

(65) Prior Publication Data

US 2002/0037351 A1 Mar. 28, 2002

(30) Foreign Application Priority Data

May 31, 2000 (GB) .............................. 0013078

(51) Int. Cl.⁷ .............................. A21D 13/00
(52) U.S. Cl. ................... 426/549; 426/94; 426/496; 426/558; 426/578
(58) Field of Search .................... 426/94, 549, 558, 426/496, 578

(56) References Cited

U.S. PATENT DOCUMENTS 2,661,349 A * 12/1953 Caldwell et al. ............ 260/224
5,711,908 A    1/1998 Tiefenbacher et al.
5,711,986 A    1/1998 Chiu et al.

FOREIGN PATENT DOCUMENTS

EP    0 811 633 A2    12/1997

OTHER PUBLICATIONS

Patent Abstracts of Japan; Publication No. 08196198; Publication Date: Jun. 8, 1996; Inventor: Nishimura Osami; Title: "Oil and Fat Composition and Production of Bread Using the Same".

Document Bibliography & Abstract; Patent No. US5,089.17; Publication Date: Feb. 18, 1992; Inventor: Chiu Chung–Wai (US); Title: "Partially Debranched Starch Clouds".

* cited by examiner

Primary Examiner—Lien Tran
(74) Attorney, Agent, or Firm—Fitch, Even, Tabin & Flannery

(57) ABSTRACT

A composition comprising untreated flour, and starch n-alkenyl succinate, and optionally starch is disclosed. Bakery products comprise aforementioned composition. Sponge cake is a typical example of these bakery products. The composition replaces chlorinated (bleached) or untreated flour or chlorinated flour and whole egg for obtaining cholesterol reduced bakery products.

17 Claims, No Drawings

BAKERY PRODUCTS CONTAINING STARCH N-ALKENYL SUCCINATE

TECHNICAL FIELD

The present invention relates to a composition comprising untreated flour, and starch n-alkenyl succinate, and optionally starch. It further relates to bakery products comprising aforementioned composition. The composition replaces chlorinated (bleached) flour or whole egg and chlorinated or untreated flour.

BACKGROUND OF THE INVENTION

In the food processing industry, including baked goods, high quality, convenience, longer shelf-life, easier storage conditions and high appeal to sight, touch, taste and smell is demanded.

New trends such as more natural, healthier (e.g. low cholesterol), more nutrious, environmental friendliness, freshness, clean label are but a few examples of what is requested.

U.S. Pat. No. 5,711,986 relates to a fat-like carbohydrate, comprising 12 to 100% by weight of short chain amylose, and said fat-like carbohydrate is used in foods in an amount effective to function as a replacement for up to 100% by weight of one or more fat(s) contained in foods.

JP 08 196198 A provides a fat-and-oil composition comprising between 50–90 weight parts fats and oils, between 1 to 20 weight parts alpha-processed starch n-octenyl succinate and between 0.5–10 weight parts of protein material. Said fat and oil composition is used for preparing soft bread, wherein for 100 weight parts of wheat flour between 1 to 15 weight parts of said oil and fat composition is applied.

One of the aforementioned trends in food processing industry, especially in bakery industry is the fact that chlorinated flour, which is used in bakery products, is more and more banned. In Germany, chlorination is already forbidden and other countries are following the same trend.

In fact, during chlorination of flour the chlorine gas reacts with many flour components and thereby alters their properties. It seems that proteins and lipids take up a large percentage of chlorine. Although the interactions with proteins and lipids bring about certain effects in cake baking these are usually of a relatively minor and insignificant nature. The fundamental difference in cake baking between chlorinated and untreated flour is due to the changes in the starch fraction of the flour. The changes in the starch fraction are responsible for preventing collapse of the cake, a higher water absorption into the starch granules and reinforcing egg gel in the cake structure.

There exists a need for suitable replacers of chlorinated flour for the preparation of high quality bakery products having good dough viscosity, and bakery products with good volume and good crumb hardness. Simultaneous reduction of cholesterol content by complete or partial replacement of whole egg is an additional advantage.

SUMMARY OF THE INVENTION

The present invention discloses a composition for use in bakery products consisting of 60–95% w/w untreated flour, 5–30% w/w starch n-alkenyl succinate and 0–50% w/w starch.

The present invention relates to a composition wherein the n-alkenyl is from $C_6$ to $C_{16}$, preferably $C_8$ (octenyl).

The starch n-alkenyl succinate is undextrinised, dextrinised, cooked-up, pregelatinised, or stabilised and/or mixtures thereof.

The current invention relates to a bakery product selected from the group consisting of bread, filled bread, bread-rolls, pound cake, sponge cake, chiffon cake, cheesecake, fruitcake, layer cake and gingerbread and characterised in that said bakery product comprises a composition consisting of 60–95% w/w untreated flour, 5–30% w/w starch n-alkenyl succinate, and 0–50% w/w starch, wherein starch n-alkenyl succinate is from $C_6$ to $C_{16}$ succinate, preferably starch $C_8$ (octenyl) succinate, and wherein starch n-alkenyl succinate is undextrinised, dextrinised, cooked-up, pregelatinised, or stabilised and/or mixtures thereof.

The current invention further relates to a bakery product which is comprising:
  a) 20–65% w/w untreated flour
  b) 1–21% w/w starch n-alkenyl succinate
  c) 0–34% w/w starch,
  d) 15–40% w/w egg, preferably between 20–40 w/w egg, more preferably between 24–32% w/w egg, and
  a) 0–10% w/w emulsifier, preferably between 0–5% w/w emulsifier, more preferably between 0–3% w/w emulsifier.

The invention further relates to a sponge cake characterised in that it is comprising from 20 to 32% w/w untreated flour, 0 to 10% w/w starch and 1 to 4% w/w starch n-alkenyl succinate.

The current invention further relates to a process for preparing these bakery products comprising the following steps:
  a) Preparing a mixture of untreated flour, and starch n-alkenyl succinate, and optionally starch,
  b) Mixing the mixture with other ingredients for obtaining a dough, and
  c) Baking the dough.

Furthermore, the present invention relates to a method for replacing chlorinated flour, or whole egg and chlorinated or untreated flour in dough of bakery products characterised in that it comprises the following steps:
  a) Providing a composition consisting of 60–95% w/w untreated flour, 5–30% w/w starch n-alkenyl succinate and 0–50% w/w starch,
  b) Formulating the dough of the bakery product such that up to 100% w/w of chlorinated flour is removed from the formulation,
  c) Replacing the chlorinated flour by said composition.

The current invention further relates to a method wherein the dough is formulated such that up to 100% w/w chlorinated or untreated flour and at least 25% w/w of whole egg is removed from the formulation and the composition consisting of 60–95% w/w untreated flour, 5–30% w/w starch n-alkenyl succinate and 0–50% w/w is replacing 100% w/w chlorinated or untreated flour and at least 25% w/w of whole egg.

DETAILED DESCRIPTION OF THE INVENTION

The present invention discloses a composition for use in bakery products characterised in that it consists of 60–95% w/w untreated flour, 5–30% w/w starch n-alkenyl succinate, and 0–50% w/w starch.

Flour is usually obtained from wheat. It is the protein of wheat flour, gluten, which distinguishes it from all the other flours and makes it of particular value in the baking industry. In hard, high-protein wheats, there is more gluten in the endosperm and the starch cells are firmly cemented together. In soft, low-protein wheats the bonding is not so firm. For most cakes a soft, low-protein flour is needed for obtaining a tender cake. Flours used for pan bread production will generally be milled from hard wheats of high protein content, although soft wheats can give optimum quality in the type of bread that is most popular in some countries.

The untreated flour present in the current composition relates to non-chlorinated flour.

The starch used in the present invention may be from a variety of sources such as corn, waxy maize, potato, pea, rice, wheat, cassava, sorghum, and the like. The starch used as such in the current composition can be unmodified (native) or modified, e.g. etherified, esterified, phosphated, cross-linked and the like.

The starch n-alkenyl succinate is characterised by the chain length of the alkenyl-group and by the substitution degree of n-alkenyl succinate on starch. Alkenyl can be from $C_6$ to $C_{16}$, preferably $C_8$ (octenyl), and the substitution degree varies between 0.2 to 3%, preferably between 0.5 to 2.5%. This substitution degree is determined by HPLC.

The starch alkenyl succinate is undextrinised, dextrinised, cooked-up or pregelatinised, stabilised and/or mixtures thereof. In essence, the starch alkenyl succinate is not including enzymatically debranched starch alkenyl succinate such as maltodextrin alkenyl succinate, since such a product is resulting in low quality bakery products, e.g. a sponge cake prepared with such product does not develop sufficient volume.

For obtaining the stabilised starch n-alkenyl succinate, the starch n-alkenyl succinate can be treated with active chlorine and can be prepared according to the process described in EP 0811633.

The present invention further relates to a composition wherein the starch n-alkenyl succinate is starch n-octenyl succinate and in a specific example starch is treated with n-octenyl succinic anhydride followed by the treatment with hypochlorite in an amount equivalent to 100 to 2000 ppm active chlorine and a high viscosity stable starch n-octenyl succinate is obtained.

The current invention relates to a bakery product selected from the group consisting of bread, filled bread, bread-rolls, pound cake, sponge cake, chiffon cake, cheesecake, fruitcake, layer cake and gingerbread and characterised in that it comprises a composition consisting of 60–95% w/w untreated flour, 5–30% w/w starch n-alkenyl succinate, and 0–50% w/w starch, wherein starch n-alkenyl succinate is from $C_6$ to $C_{16}$ succinate, preferably starch $C_8$ (octenyl) succinate, and wherein starch n-alkenyl succinate is undextrinised, dextrinised, cooked-up, pregelatinised, or stabilised and/or mixtures thereof.

In fact, the composition of the current invention is suitable for any bakery product, which normally contains chlorinated or untreated flour.

The bakery product normally comprises from 20 to 65% w/w flour (chlorinated or untreated), from 0 to 35% w/w sugar, from 0 to 40% egg (whole egg, or egg yolk, and/or egg white), and from 0 to 10% w/w emulsifier.

The current invention further relates to a bakery product comprising 20–65% w/w untreated flour, 1–21% w/w starch n-alkenyl succinate, 0–34% w/w starch, 15–40% w/w egg, preferably between 20–40 w/w egg, more preferably between 24–32% w/w egg, and 0–10% w/w emulsifier, preferably between 0–5% w/w emulsifier, more preferably between 0–3% w/w emulsifier.

A typical example of a sponge cake normally comprises 31% w/w chlorinated flour, 31% w/w sugar, 31% w/w egg and 3% w/w emulsifier.

The current invention relates to a sponge cake comprising from 20 to 32% w/w untreated flour, 0 to 10% w/w starch and 1 to 4% w/w starch n-alkenyl succinate.

The composition of the current invention can replace chlorinated flour, and the properties of the resulting bakery product, such as dough viscosity, dough volume, crumb hardness, and volume of the bakery products are comparable with the properties of bakery products prepared with chlorinated flour. The bakery products comprising the composition of the current invention have dough and bakery product properties, which are superior to the properties of the bakery products prepared with untreated flour.

The quality of the dough of the bakery products is determined by measuring, immediately after preparing the dough, the dough viscosity with a Stevens Texture analyser using the cone and measuring at penetration depth of 30 mm. The quality of the dough is further characterised by its specific volume.

The quality of the baked products is determined by measuring the specific volume and the height of the bakery products. The hardness of the crumb of the baked products is further determined after packaging of the bakery products and storing the packed bakery products at 20° C. for 2 days, 7 days and 15 days, respectively. The hardness of the crumb is measured with Stable Micro Systems. In a comparative example the aforementioned properties of sponge cake prepared with chlorinated and untreated flour, respectively, are determined. The sponge cake prepared with chlorinated flour has superior properties compared to the sponge cake prepared with untreated flour. Example 1 describes the preparation of sponge cake containing the composition of the current invention and without chlorinated flour. This sponge cake has properties, which are similar to the sponge cake prepared with chlorinated flour.

Furthermore, the currently disclosed composition can be used for replacing in those bakery products 100% w/w of the chlorinated flour and whole egg to an extent of from 0 to 63% w/w, preferably from 0 to 50% w/w, more preferably from 20 to 40% w/w, respectively.

In particular chlorinated flour and whole egg is replaced by a mixture of water and the composition comprising untreated flour, and starch n-alkenyl succinate.

Partial replacement of whole egg results in cholesterol-reduced compositions.

Example 2 describes the replacement in bakery products of 100% w/w chlorinated flour and 25 w/w of whole egg by a mixture of 15% w/w water and 85% w/w of a composition which is consisting of 66% w/w untreated flour, 28% starch and 6% starch n-alkenyl succinate. The quality of these sponge cakes is comparable with the quality of sponge cake prepared with chlorinated flour and yet the obtained sponge cake is reduced in cholesterol content. Example 2 describes further that bakery products with good dough and baking properties are obtained by replacing 100% w/w chlorinated or untreated flour and 50% w/w of whole egg by a mixture of 25% w/w water and 75% w/w of a composition consisting of 12% w/w starch n-alkenyl succinate and 88% w/w untreated flour. However, the crumb of these products is harder.

The current invention further relates to a process for preparing these bakery products comprising the following steps:
  a) Preparing a mixture of untreated flour, and starch n-alkenyl succinate, and optionally starch,
  b) Mixing the mixture with other ingredients for obtaining a dough, and
  c) Baking the dough.

Furthermore, the present invention relates to a method for replacing chlorinated flour, or whole egg and chlorinated or untreated flour in dough of bakery products characterised in that it comprises the following steps:
  d) Providing a composition consisting of 60–95% w/w untreated flour, 5–30% w/w starch n-alkenyl succinate and 0–50% w/w starch,
  e) Formulating the dough of the bakery product such that up to 100% w/w of chlorinated flour is removed from the formulation,
  f) Replacing the chlorinated flour by said composition.

The current invention further relates to a method wherein the dough is formulated such that up to 100% w/w chlorinated or untreated flour and at least 25% w/w of whole egg is removed from the formulation and the composition consisting of 60–95% w/w untreated flour, 5–30% w/w starch n-alkenyl succinate and 0–50% w/w is replacing 100% w/w chlorinated or untreated flour and at least 25% w/w of whole egg.

In these bakery products the cholesterol content is reduced for at least 25%.

The current invention has the following advantages:
  bakery products containing the presently disclosed compositions have superior properties compared to bakery products prepared with untreated flour.
  The quality of said bakery products is equally good as the quality of bakery product prepared with chlorinated flour.
  The currently disclosed composition allows replacement of at least 25% w/w egg for obtaining cholesterol reduced bakery products.

The current invention is illustrated by the following examples.

COMPARATIVE EXAMPLE 1

Comparison of Sponge Cake Prepared with Chlorinated Flour and Sponge Cake Prepared with Untreated Cake Flour Recipe:

| Ingredients (g): | Sponge cake with chlorinated flour | Sponge cake with untreated cake flour |
|---|---|---|
| Chlorinated flour | 300 | 0 |
| Untreated flour (Koopmans) | 0 | 300 |
| Sugar S1 | 300 | 300 |
| Whole eggs (25° C.) | 300 | 300 |
| BV40 (Emulsifier DMV) | 30 | 30 |
| Water | 36 | 36 |
| Baking powder | 9 | 9 |
| Total | 975 | 975 |

Procedure:
All ingredients were mixed in a Hobart-mixer during 1.5 minute on medium speed, followed by 2 minutes on high speed.

400 grams of dough was poured in a greased/floured pan with a diameter of 22 cm.

The dough was baked during 30 minutes at 180° C. in a tray oven.

The sponge cake was packed 60 minutes after baking, and was stored at 20° C.

Analysis:

The viscosity of the dough was determined, immediately after preparing the dough, by Stevens Texture Analyser, using the cone and measuring at penetration depth of 30 mm.

The hardness of the crumb was measured with Stable Micro Systems, after packaging of the bakery products and storing the packed bakery products at 20° C. for 2 days, 7 days and 15 days, respectively.

The obtained properties are described in Table 1.

TABLE 1

|  | Sponge cake with chlorinated flour | Sponge cake with untreated cake flour |
|---|---|---|
| Dough |  |  |
| Stevens viscosity (load-gram) | 43 | 36 |
| Specific volume cm³/g | 2.05 | 1.79 |
| Sponge cake |  |  |
| Height (mm) | 51 | 44 |
| Specific volume cm³/g | 3.87 | 3.63 |
| Crumb colour | Light yellow | Yellow |
| Hardness of crumb (g) |  |  |
| After 2 days | 424 | 411 |
| After 7 days | 571 | 491 |
| After 15 days | 708 | 717 |
| Moisture (after 7 days at 20° C. storage) | 23.7 | 25.3 |

Chlorinated flour gives more dough viscosity and higher specific dough volume than untreated flour.

Chlorinated flour gives a positive impact on the cake volume, especially the height of the cake is higher for chlorinated flour in comparison to untreated flour.

EXAMPLE 1

Sponge Cake Wherein the Composition of the Current Invention is Replacing Chlorinated Flour Recipe:

| Ingredients (g) | 1 | 2 | 3 | 4 |
|---|---|---|---|---|
| Chlorinated flour | 0 | 0 | 0 | 0 |
| Untreated flour (Koopmans) | 285 | 270 | 255 | 240 |
| C☆EmCap 063E7 | 15 | 30 | 45 | 60 |
| Sugar S1 | 300 | 300 | 300 | 300 |
| Whole eggs (25° C.) | 300 | 300 | 300 | 300 |
| BV40 (Emulsifier DMV) | 30 | 30 | 30 | 30 |
| Water | 36 | 36 | 36 | 36 |
| Baking powder | 9 | 9 | 9 | 9 |
| Total | 975 | 975 | 975 | 975 |

C☆EmCap 063E7 = starch n-octenyl succinate (available from Cerestar).

Procedure and Analysis:
The procedure and the method of analysis were identical to comparative example 1.

The obtained properties are described in Table 2.

TABLE 2

|  | 1 | 2 | 3 | 4 |
|---|---|---|---|---|
| Dough |  |  |  |  |
| Stevens viscosity (load-gram) | 37 | 39 | 39 | 40 |
| Specific volume cm³/g | 1.85 | 1.90 | 1.96 | 1.96 |
| Sponge cake |  |  |  |  |
| Height (mm) | 50 | 48.5 | 50 | 49 |
| Specific volume cm³/g | 3.91 | 3.87 | 4.02 | 4.09 |
| Crumb colour | Slight yellow | Slighter yellow | Slighter yellow | Slighter yellow |
| Hardness of crumb (g) |  |  |  |  |
| After 2 days | 366 | 339 | 330 | 404 |
| After 7 days | 485 | 475 | 501 | 585 |
| After 15 days | 709 | 619 | 622 | 674 |
| Moisture (after 7 days at 20° C. storage) | 25.4 | 25.0 | 24.8 | 24.8 |

Already in trial 1, the difference between cake with untreated flour and chlorinated flour is restored by replacing 5% of flour with starch n-octenyl succinate.

Especially the sponge cake structure, prepared with a composition wherein 15% of flour is replaced with starch n-octenyl succinate, is comparable to a cake prepared with chlorinated flour.

Replacement of flour by starch n-octenyl succinate gives positive results on softness and chewability.

The quality of the sponge cake prepared with the composition of the current invention is as good as the quality of the sponge cake prepared with chlorinated flour. The sponge cake comprising the composition of the current invention is better than the sponge cake prepared with untreated flour.

EXAMPLE 2

Sponge Cake Wherein Chlorinated or Untreated Flour and Partly Whole Egg is Replaced Recipe:

| Ingredients (g) | 5 | 6 |
|---|---|---|
| Replacement 100% flour + whole egg: | 50% whole egg | 25% whole egg |
| Chlorinated flour | 0 | 0 |
| Untreated flour (Koopmans) | 300 | 210 |
| C☆Gel 20006 |  | 90 |
| C☆EmCap 063E7 | 37.5 | 19 |
| Sugar S1 | 300 | 300 |
| Whole eggs (25° C.) | 150 | 225 |
| BV40 (Emulsifier DMV) | 30 | 30 |
| Water | 148.5 | 92 |
| Baking powder | 9 | 9 |
| Total | 975 | 975 |

C☆Gel 20006 = wheat starch (available from Cerestar)
C☆EmCap 063E7 = starch n-octenyl succinate (available from Cerestar).

Procedure and Analysis:

The procedure and the method of analysis were identical to comparative example 1.

The obtained properties are described in Table 3.

TABLE 3

|  | 5 | 6 |
|---|---|---|
| Dough |  |  |
| Stevens viscosity (load-gram) | 50 |  |
| Specific volume cm³/g | 1.91 |  |
| Sponge cake |  |  |
| Height (mm) | 46 | 51 |
| Specific volume cm³/g | 3.84 | 3.84 |
| Crumb colour | White | Slight yellow |
| Hardness of crumb (g) |  |  |
| After 2 days | 455 | 366 |
| After 7 days | 595 |  |
| After 15 days | 861 |  |
| Moisture (after 7 days at 20° C. storage) | 25.1 |  |

The sponge cake wherein 25% of whole egg is replaced gives a cake with good cake volume.

The sponge cake wherein 50% of whole egg is replaced, does not give pronounced negative properties. However, the hardness of the crumb is higher.

What is claimed is:

1. A composition for use in bakery products that consists of:
    a) 60–95% w/w non-chlorinated flour;
    b) 5–30% w/w starch n-alkenyl succinate; and
    c) 0–50% w/w starch.

2. A composition according to claim 1, wherein the alkenyl succinate is a $C_6$ to $C_{16}$ alkenyl succinate.

3. A composition according to claim 1, wherein the alkenyl succinate is n-octenyl succinate.

4. A composition according to any one of claims 1, 2 or 3, wherein the starch n-alkenyl succinate is selected from the group consisting of undextrinized starch n-alkenyl succinate, dextrinized starch n-alkenyl succinate, cooked-up starch n-alkenyl succinate, pregelatinized starch n-alkenyl succinate, stabilized starch n-alkenyl succinate, and a mixture of any thereof.

5. A composition according to claim 4, wherein said starch n-alkenyl succinate is stabilized starch n-octenyl succinate.

6. A bakery product selected from the group consisting of bread, filled bread, bread rolls, pound cake, sponge cake, chiffon cake, cheesecake, fruitcake, layer cake and gingerbread, wherein said bakery product is obtained from a dough composition that contains a dough base consisting of 60–90% w/w untreated flour consisting essentially of non-chlorinated flour, 5–30% w/w starch n-$C_6$–$C_{16}$ alkenyl succinate, and 0–50% w/w starch, wherein said starch n-$C_6$–$C_{16}$ alkenyl succinate is not enzymatically debranched and is selected from the group consisting of undextrinized starch n-$C_6$–$C_{16}$ alkenyl succinate, dextrinized n-$C_6$–$C_{16}$ alkenyl succinate, cooked-up n-$C_6$–$C_{16}$ alkenyl succinate, pregelatinized n-$C_6$–$C_{16}$ alkenyl succinate, stabilized n-$C_6$–$C_{16}$ alkenyl succinate and a mixture of any thereof, and wherein said n-$C_6$–$C_{16}$-alkenyl succinate is not a maltodextrin alkenyl succinate.

7. A bakery product according to claim 3, wherein said starch n-$C_6$–$C_{16}$ alkenyl succinate is starch n-octenyl succinate.

8. A bakery product which is selected from the group consisting of pound cake, sponge cake, chiffon cake, cheesecake, fruitcake, layer cake, and gingerbread, wherein said bakery product, before baking, comprises:
 a) 20–65% w/w non-chlorinated flour;
 b) 1–21% w/w starch n-alkenyl succinate, wherein said starch n-alkenyl succinate is not enzymatically debranched and is not a maltodextrin alkenyl succinate;
 c) 0–34% w/w starch;
 d) 15–40%w/w egg; and
 e) 0–10% w/w emulsifier.

9. A bakery product according to claim 8, wherein said bakery product contains 20–40% w/w egg.

10. A bakery product according to claim 8, wherein said bakery product contains 24–32% w/w egg.

11. A bakery product according to claim 7, 8 or 9, wherein said bakery product contains 0–5% w/w of said emulsifier.

12. A bakery product according to claim 7, 8, or 9, wherein said bakery product contains 0–3% w/w of said emulsifier.

13. A bakery product according to claim 8, wherein said starch n-$C_6$–$C_{16}$ alkenyl succinate is starch n-octenyl succinate.

14. A method for replacing a chlorinated flour in a dough formulation for a bakery product wherein said method comprises:
 a) formulating the dough for a bakery product such that up to 100% w/w of chlorinated flour is removed from the formulation, and
 b) replacing the removed chlorinated flour with a composition comprising 60–95% w/w non-chlorinated flour, 5–30% w/w starch n-alkenyl succinate, and 0–50% w/w starch.

15. A method according to claim 14, wherein a) the dough is formulated such that up to 100% w/w of chlorinated flour and at least 25% w/w of whole egg, when whole egg is present, is removed from the formulation, and in b) the chlorinated flour and at least 25% w/w of whole egg, when present, is replaced by said composition.

16. A method according to claim 15, wherein said method further comprises c) baking the dough obtained in b).

17. A bakery product which comprises a sponge cake, when unbaked, comprised of
 a) 20–32% w/w non-chlorinated flour;
 b) 1–4% w/w starch n-alkenyl succinate;
 c) 0–10% w/w starch;
 d) 15–40%w/w egg; and
 e) 0–10% w/w emulsifier.

* * * * *